July 20, 1965  J. H. HART  3,195,813

CALORIE COUNTER

Filed Feb. 25, 1963

JAMES H. HART
INVENTOR.

BY Edward A. Gordon

ATTORNEY

United States Patent Office 3,195,813
Patented July 20, 1965

3,195,813
CALORIE COUNTER
James H. Hart, 4 Rockyhill Road, Andover, Mass.
Filed Feb. 25, 1963, Ser. No. 260,575
2 Claims. (Cl. 235—90)

This invention relates to calculators or counters and more particularly to a counter for totalizing the calorie value contained in a plurality of substances.

A principal object of the present invention is to provide an improved calculator which permits the ready addition of predetermined units of value of a plurality of successively selected substances.

Another object of the present invention is to provide an improved counter arranged for rapid selection among a plurality of substances and the ready addition of the calorie value of the selected substances.

Another object of the present invention is to provide an improved calculator of simplified construction and low cost of manufacture.

A further object of the present invention is to provide a calculator of simple construction which is arranged to hold or lock the count indicator in any position at which it is set.

A still further object of the present invention is to provide a counter which permits the ready addition of predetermined units of calorie value contained in various foodstuffs and which can be conveniently carried on the person.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
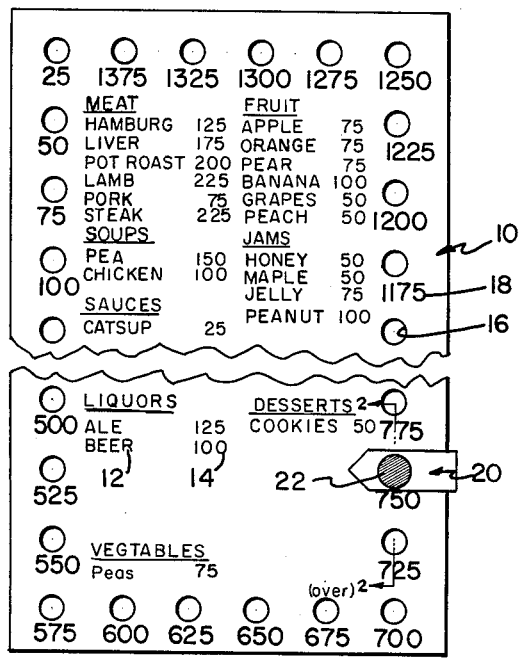
FIGURE 1 is a perspective view of a device embodying the invention.

Referring now to the drawing there is shown one preferred embodiment of the present invention. The counter of the present invention comprises a flat member 10 which preferably consists of a rectangular piece of relatively stiff plastic material.

The flat member 10 has printed thereon a plurality of indicia 12 which represents chosen units of quantity, measurement or weight of a class of foodstuffs or to specific items of a foodstuff class.

Adjacent each indicia 12 there are printed numerals 14 which represent the number of units of calorie value in the designated unit of quantity, measurement or weight of the class or specific food items. In the preferred embodiment of the present invention, the numerals 14 represent the number of units of calorie value to the nearest even multiple of 25. Thus, for example, if the calorie value of the selected quantity of foodstuff is 115 the numeral adjacent thereto will be 125.

In the preferred embodiment of the invention illustrated in the drawing, a scale for indicating the changing total calorie value of the chosen quantities of food items selected by the individual consumer is provided on the margin or periphery of the flat member 10. The totalizing scale comprises a plurality of apertures or openings 16 positioned around the margin of the flat member 10. A series of numerals 18 are printed on the flat member 10 adjacent the openings 16. The numerals 18 are preferably arranged in arithmetic progression in which the arithmetic progression is determined by adding a constant quantity equal to the even multiple of the calorie value. In the preferred embodiment the constant quantity is 25. A totalizing indicator or character 20 is provided for insertion into the openings adjacent the numeral designating the accumulation or sum of the calorie values for the selected food item or combination or schedule of selected food items.

Figures 2, 3:
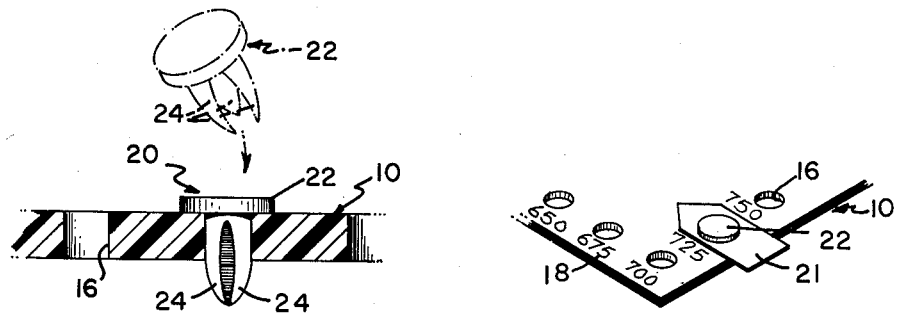
FIGURE 2 is an enlarged fragmentary sectional view of a portion of FIGURE 1 showing the count indicator.
FIGURE 3 is an enlarged fragmentary view showing the arrangement of the count indicator in the totalizing scale.

The totalizing indicator 20 preferably consists of an upper flat portion 22 having its lower surface inclined to the flat member 10 to facilitate removal when the indicator is inserted into an opening 16 in the totalizing scale. The lower portion of the totalizing indicator 20 preferably consists of at least three prong members 24. The totalizing indicator 20 is preferably formed of a yieldably resilient plastic material. The prongs when pressed into the hole or opening 16 are sufficiently yieldable from their normal position (as shown by the dotted lines of FIGURE 2) so that they move toward each other permitting insertion into the opening adjacent the numerals representing the total calorie value of the foods selected. The prongs are sufficiently resilient to thereby hold or lock the indicator firmly in place until removed and inserted in another opening.

In a preferred form of the invention a tab or collar member 21 is provided about the totalizing indicator 20 to facilitate removal of the indicator when inserted into an opening 16 in the totalizing scale.

In operation of the calorie counter shown, which is particularly useful for indicating the accumulation or sum of calories of food items selected by the operator, the operator can determine from numerals 14 the number of calories contained in the selected food item adajcent thereto. The totalizing indicator is then advanced to an opening in the totalizing scale adjacent the numerals 18 representing the arithmetic sum of the calorie value of food items selected. Thus, the operator, by merely observing the totalizing indicator can determine whether selected food items should be increased or reduced in order to keep the calorie total within a required range, for example, for an individual.

In another embodiment of the present invention, additional indicia 12 may be provided on the reverse side of the flat member 10 together with additional numerals 14 representing the calorie value thereof. In this embodiment of the invention the arithmetic progression of numerals 18 are continued on the reverse side of the flat member. The totalizing indicator can be inserted in the openings from the reverse side in the same manner as described above.

While the invention has been described with respect to a preferred embodiment, numerous modifications can be made within the spirit of the invention. For example, the totalizing scale can consist of a plurality of columns of openings arranged in parallel to the indicia 12 which represents the foodstuffs.

While the upper portion 22 of the totalizing indicator has been shown as having a disc configuration, numerous other geometric configurations and shapes can be employed. Similarly the numerous geometric configurations of the tab 21 can be employed.

Since certain changes may be made in the above apparatus without departing from the scope of the invention herein involved, it is intended that all matter contained in the above description, or shown in the accompanying drawing, shall be interpreted as illustrative and not in a limiting sense.

What is claimed is:

1. A calorie counter comprising a single sheet member, a plurality of fixed columns of indicia on each side of said sheet member relating to foodstuffs, a series of figures positioned adjacent said indicia of foodstuff, each figure indicating the calorie value of said indicia of foodstuff adjacent thereto, a totalizing scale comprising a series of numerals disposed in arithmetic progression around the margin of said sheet member for indicating the changing total calorie value of selected foodstuffs, openings in the margin of said sheet member adjacent said numerals and an indicator character adapted to be inserted from either side of said sheet member into any of said openings adjacent said numerals to indicate the changing total calorie value.

2. A calorie counter comprising a thin plastic sheet member, a plurality of fixed indicia on at least one side of said thin plastic sheet member relating to units of quantities of foodstuffs, a series of figures positioned adjacent said indicia, each figure indicating the calorie value of said foodstuff adjacent thereto and being an even multiple of 25, a totalizing scale comprising a series of numerals disposed in arithmetic progression about the margin of said sheet member for indicating the changing total calorie value of selected foodstuffs, openings in the margin adjacent said numerals, a totalizing indicator for insertion into any of said openings, said indicator having resilient means for holding said indicator stationary until advanced to another opening consisting of three yieldably resilient prong members.

References Cited by the Examiner
UNITED STATES PATENTS

| | | | |
|---|---|---|---|
| 592,081 | 10/97 | Crocker | 235—90 |
| 715,799 | 12/02 | Hendrickson | 129—16.5 |
| 766,545 | 8/04 | Sterl. | |
| 990,640 | 4/11 | Dodge | 235—90 |
| 1,280,903 | 10/18 | Troxel | 235—90 X |
| 1,324,041 | 12/19 | Furrell | 273—136 |
| 1,714,792 | 5/29 | Kurihard. | |
| 2,017,479 | 10/35 | Terkelsen | 235—90 |
| 2,260,069 | 10/41 | Whitson | 129—16.8 |

LEO SMILOW, *Primary Examiner.*

LEYLAND M. MARTIN, *Examiner.*